United States Patent [19]

Ganz

[11] Patent Number: 4,959,653

[45] Date of Patent: Sep. 25, 1990

[54] ADAPTIVE SIDELOBE BLANKER

[75] Inventor: Matthew W. Ganz, Chelmsford, Mass.

[73] Assignee: Massachusetts Institute of Technology, Cambridge, Mass.

[21] Appl. No.: 397,658

[22] Filed: Aug. 23, 1989

[51] Int. Cl.$^5$ .............................................. G01S 3/80
[52] U.S. Cl. ...................................... 342/17; 342/379
[58] Field of Search .................. 342/17, 367, 379–381

[56] References Cited

U.S. PATENT DOCUMENTS

| 4,010,469 | 3/1977 | Marcum | 342/ |
| 4,353,119 | 10/1982 | Daniel et al. | 342/ |
| 4,450,448 | 5/1984 | Abanese et al. | 342/ |
| 4,495,502 | 1/1985 | Masak | 342/ |

FOREIGN PATENT DOCUMENTS

| 0043580 | 2/1987 | Japan | 342/17 |
| 0001057 | 2/1986 | World Int. Prop. O. | 342/17 |

OTHER PUBLICATIONS

Eilts, H. S. et al., *Cascaded Adaptive Arrays*, Ohio State University Electro Science Laboratory, Sep. 1984, pp. 5–11.

Maisel, L., *Performance of Sidelobe Blanking Systems*, IEEE Transactions on Aerospace and Electronics Systems, Mar. 1968, pp. 174–180.

Monzingo, R. A. et al., *Introduction to Adaptive Arrays*, John Wiley & Sons, 1980, pp. 293–307.

Reed, L. S. et al., *Rapid Convergence Rate in Adaptive Arrays*, IEEE Transactions on Aerospace and Electronic Systems, Nov. 1974, pp. 853–863.

Chin, J. E., et al., *Reducing the Interference . . .* IEEE Publication 89CH2685, Jun. 1989, pp. 141–146.

Compton, Jr., R. T., *The Power-Inversion Adaptive Array*, IEEE Transactions on Aerospace and Electronic Systems, Nov. 1979, pp. 803–814.

Compton, Jr., R. T., *Adaptive Antennas-Concepts and Performance*, Prentice Hall, 1988, pp. 20, 25, 143, 326–330, 385.

Primary Examiner—Thomas H. Tarcza
Assistant Examiner—Mark Hellner
Attorney, Agent, or Firm—Hamilton, Brook, Smith & Reynolds

[57] ABSTRACT

An adaptive sidelobe blanker uses the covariance matrix used to form an adaptively nulled main channel to generate an adaptively nulled version of an omnidirectional antenna pattern. Individual antenna control includes sampling, digitizing, and storage of an antenna signal. Complex antenna weights manipulate the antenna signals in both the main channel and the blanker channel to provide desired steering of the antenna nulls. The adaptively nulled blanker channel is compared to the adaptively nulled main channel to determine if a received target return is a main beam target or a sidelobe target.

12 Claims, 2 Drawing Sheets

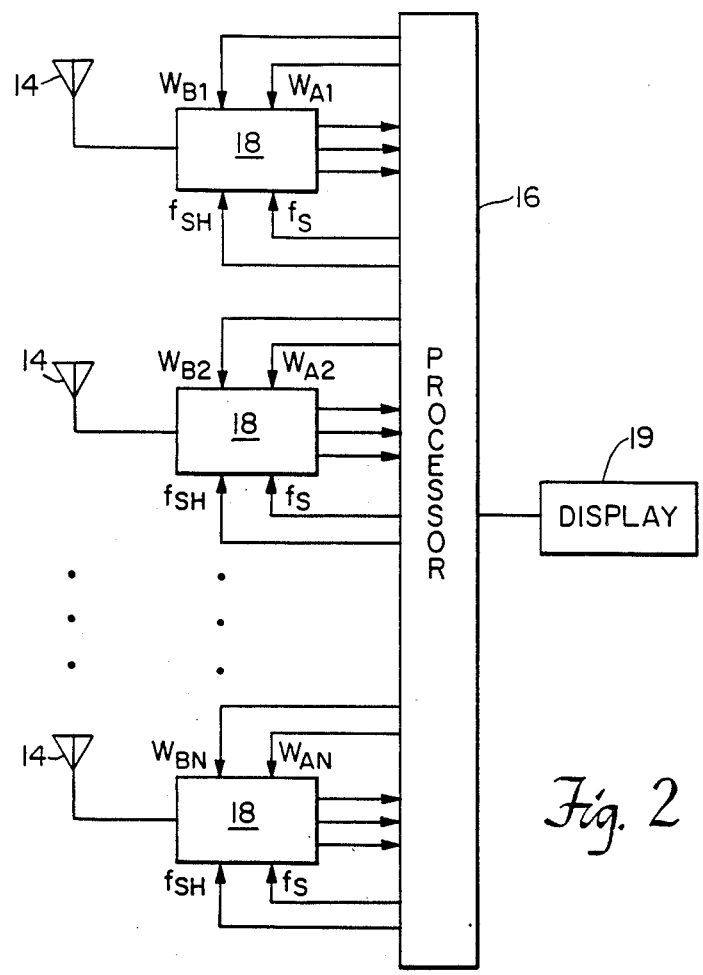
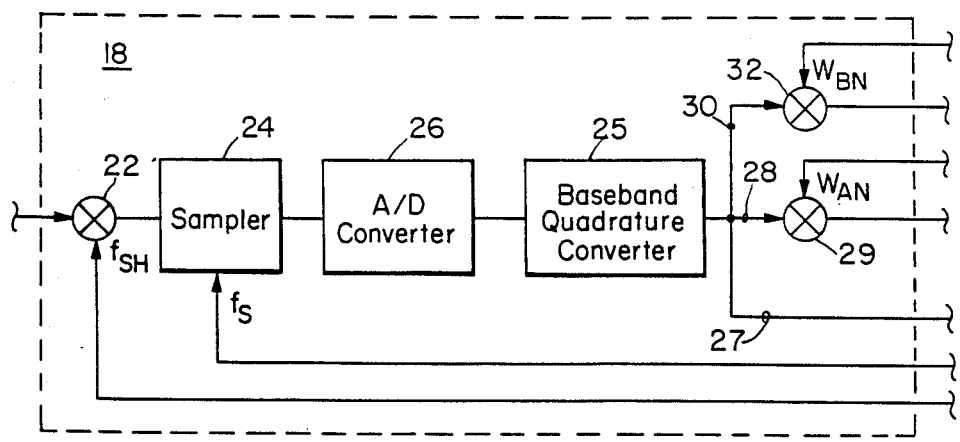
Fig. 2
Fig. 3

ADAPTIVE SIDELOBE BLANKER

The Government has rights in this invention pursuant to contract No. F19628-85-C-0002 awarded by the Department of the Air Force.

BACKGROUND OF THE INVENTION

One of the more common problems in the operation of a radar system is the reduction of interference in the radar receiver. Interfering signals may be due to reflection of the transmitted radar signal from directions not of present interest, or they may be independently generated. In military applications, a continuous wave radio frequency source, or jammer, is often aimed at an enemy radar station to purposely disturb the operation of the receiver at that station.

A number of different techniques are used to decrease the interference level in radar receivers. One interference reduction technique, called side-lobe blanking, eliminates false target readings in the receiver. Signals that are transmitted by a particular radar may undergo reflection from objects away from the intended look direction. If the magnitude of such an undesired reflection is great enough, it could be mistaken for a target sighting in the main beam direction. A sidelobe blanker is a device that eliminates such unwanted returns. Other interference rejection techniques are used to eliminate non-pulsed, or continuous-wave (CW), interference. Such interference may be sinusoidal, modulated or noise-like in nature. A jammer or other CW noise source may decrease the dynamic range of the radar receiver. Adaptive nulling is an often used technique for rejecting CW interference. Adaptive nulling rejects such interference by reducing the directional sensitivity of the radar antenna in the interference direction(s).

SUMMARY OF THE INVENTION

In accordance with the present invention, an interference representation of interference signals received through an antenna array is generated. Thereafter, a radar signal is transmitted and a reflected signal is received through each antenna of the antenna array. An adaptively nulled representation of the reflected signal is generated by weighting the received signals by a first weighting matrix. The first weighting matrix defines a main beam pattern, with at least one dominant lobe, modified by the interference representation. A blanking signal is generated by weighting the received signals by a second weighting matrix which defines a generally omnidirectional antenna pattern modified by the interference representation. A radar display of the adaptively nulled representation blanked by the blanking signal is provided.

More specifically, a method is provided for detecting radar signals in the presence of pulsed and continuous interference using an antenna array. Before a radar signal is transmitted the signal environment is sampled by taking several instantaneous samples of the signals that appear on the antenna elements. These samples are then mathematically combined to form a matrix called the covariance matrix. Antenna weights are determined by premultiplying a vector called the steering vector by the inverse of the covariance matrix. These antenna weights are used to weight the signals that are received on the antenna elements after a radar signal is transmitted. The steering vector is composed of the weights that give the desired antenna pattern in the absence of interference. This technique is called adaptive nulling.

In this invention two sets of adaptively nulled antenna response patterns are generated using the signals on the same antenna elements through the separate but simultaneous application of two different sets of weights to the signals on the elements. These weights are obtained by modifying two different steering vectors by the covariance matrix inverse. The first antenna response pattern has a narrow beam in the direction that target signals are expected and a low response in all other directions. This pattern is the main beam pattern and is used to detect targets. The second antenna pattern has an omnidirectional response at a level slightly higher than the main beam response in the non-look direction. The signals received using this second antenna pattern are sent to a separate radar receiver, called a sidelobe blanker, which generates a blanking signal. Adaptive nulling is used to form a null in both the main beam and the blanker pattern. These nulls eliminate non-pulsed interference from both the main and blanker receivers.

When a target is detected in the main beam, the radar system compares the strength of the target signal in the main beam to that of the blanking signal. If the blanking target signal is larger than the main beam target signal the target is rejected, or blanked, since it has been determined to arrive from a direction other than that of the main beam.

BRIEF DESCRIPTION OF THE DRAWINGS

FIG. 2 shows an overview block diagram of the Adaptive Sidelobe Blanker.

FIG. 3 shows the details of an antenna control node.

DETAILED DESCRIPTION OF A PREFERRED EMBODIMENT

Modern radar receivers often use a phased array of antennas positioned in a spatial configuration relative to one another. Such receivers collect the signals received on all the antennas of the array and combine them. Complex weighting can be applied to the receiver outputs to emphasize signals that arrive from certain directions while suppressing signals that arrive from other directions. Signals can be emphasized by adjusting the antenna position and complex weights so that the element signals add coherently. Signals can be suppressed by adjusting the antenna position and complex weights so that the signals undergo phase cancellation. These suppressed signals are effectively nullified and undetectable in the combined signal. This phase cancellation is dependent on the radial direction from which the radar signal approaches the antenna array, and the complex weighting. Thus, by selectively positioning the elements of the antenna array and choosing complex weights, chosen radial directions of radar signal input to the receiver may be nullified.

The selective positioning and weighting of a phased array of antennas leas to a technique known as adaptive nulling. When a large interference source such as a continuous wave jammer delivers a large interference signal towards the radar receiver from a single direction, the complex weights may be adaptively adjusted specifically to eliminate signals input from that radial direction, thus nullifying the interference input by the continuous wave source.

Figure 1:
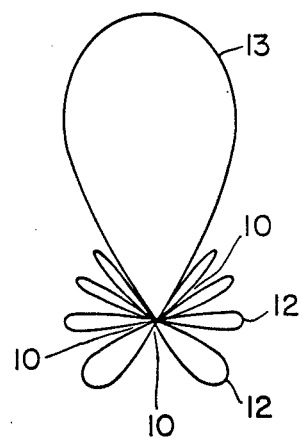
FIG. 1 shows the antenna response pattern of a radar signal received by a phased antenna array.

FIG. 1 shows a two-dimensional polar plot which illustrates the directional sensitivity of a radar receiver using adaptive nulling. Nulls 10 indicate radial directions from which input radar signals will undergo complete phase cancellation. Lobes 12, called sidelobes, indicate regions of acceptance by the radar receiver, the peaks of the lobes 12 pointing toward directions which have minimal phase cancellation. A dominant lobe 13 is shown as being larger than the other lobes. This lobe indicates the direction of the main beam. The direction of the main beam is the least attenuated direction.

One method of controlling the relative location of the nulls of a phased antenna array is by the statistical weighting of the signals received by the array. By modifying the magnitude and phase of the signals received by the antenna prior to combining them, the locations of the nulls and lobes in the polar characteristic plot are adjusted. When focusing the radar in one direction, the dominant lobe is oriented in that direction by setting the complex antenna weights so as to ensure minimal attenuation for that lobe and large attenuation for the other lobes.

Shown in FIG. 2 is a phased array of N antennas 14. The number and arrangement of antennas 14 may be chosen to suit the requirements of the system and the number dictates the number of lobes which are generated and the width of the main beam. A processor 16 distributes complex antenna weights to each pair of antenna mixer nodes 18. A radar display 19 receives output signals from the processor 16 and displays them in a usable form.

The values of the antenna weights are assembled by the processor 16 in the form of a weight vector. Without adaptive nulling one would use a weight vector that is calculated to produce an antenna pattern that is ideal for the situation assuming there is no incident interference upon the array. This calculated weight vector is called the steering vector. However, to best steer the nulls of the pattern, it is desirable to adjust the pattern nulls with regard to any incident interference to reduce signal interference by means of a process known as adaptive nulling. This adjustment is achieved through the use of a weight vector that is slightly different from the steering vector. Adaptive nulling is the technique used to adjust the steering vector into the adaptive weight vector.

In adaptive nulling, the receiver is first allowed to just "listen" to the area without generating any radar pulses. The signals received on each antenna are compiled and used to form a covariance matrix for the incident signals. The antenna array of FIG. 2 comprises N individual antennas each having a different weight. Because the covariance matrix is composed of the expected products of each antenna signal with each of the other antenna signals, the array of N antennas generates an N x N covariance matrix. During the "listening" process, any ambient signals are received and stored in processor memory. Thus, the covariance matrix constructed from the antenna signals contains information representing the strength and arrival angles of interfering signals.

Once the covariance matrix is obtained, the final set of weights for the adaptively nulled channel may be obtained by multiplying the inverse of the covariance matrix by the original steering vector. The result is another vector containing new weights for the adaptively nulled system which take into account the interference incident upon the array of antennas. A radar signal is then sent toward a target in the main beam, and the reflections are received, processed by the processor 16, and displayed on display 19. Therefore, the adaptive nulling system provides for the elimination of continuous wave jammer sources that arrive from directions other than that specified by the steering vector. These interference sources are nullified and rendered effectively invisible to the radar system.

Control node 18 is shown in more detail in FIG. 3. As a signal is received by an antenna 14, it enters a mixer 22. The signal is then mixed with a shifting signal $f_{SH}$ generated by the processor 16. The signal $f_{SH}$ shifts the antenna signal to a lower frequency band. Once in the lower band, the antenna signal is sampled by a sampler 24, at a sampling frequency $f_s$ generated by the processor 16. The samples are then digitally coded by an A/D converter 26. The output of the A/D converter is then shifted down again in frequency in quadrature in the Baseband Quadrature Converter 25. The outputs from this converter are the complex samples of the signal.

The complex antenna signal samples are applied to three different circuit branches 27, 28, 30. Branch 27 leads directly to the processor 16 where the unweighted antenna signal is stored in processor memory. Having the antenna signal stored in digital form allows the signal to be manipulated easily by the processor 16 either immediately in real time or later.

When determining the covariance matrix, the processor 16 uses the unweighted signals input along branch 28. The processor 16 receives the unmodified antenna signal from each antenna 14 and assembles the covariance matrix. The processor 16 then takes the inverse of the covariance matrix and multiplies it by the steering vector already stored in processor memory. The resulting vector contains the adaptive weights each of which is then applied to its respective antenna input signal. Radar signals are then transmitted in the direction of a target. Reflected radar signals are weighted by the adaptive weights and assembled by the processor 16.

The adaptive weight for the Nth antenna in the array is labeled in FIG. 3 as $W_{AN}$. Branch 28 delivers the digitized antenna signal from the A/D converter 26 to multiplier node 29. At node 29, the antenna signal is multiplied by weight $W_{AN}$ of the adaptive array. The output of node 29 represents one element of the overall adaptive array signal and is input to the processor 16 to be assembled with the weighted adaptive array signals from the other antennas. When combined, the adaptive array signals form the desired adapted antenna pattern.

A traditional sidelobe blanker channel is a radar receiver channel that is connected to an omnidirectional antenna. The blanker channel may be used to determine whether the return signal is a target in the main beam or a noise signal in one of the directional sidelobes. After a radar signal is transmitted and the returns received and recorded, the strength of target returns in the main antenna channel are compared with the strength of returns in the blanker channel by the controller 16. A decision is then made for the target based upon these relative signal strengths. If the target return is larger in the main channel than in the blanker channel, the target is determined to be a main beam target. If the target return is greater in the blanker channel, it is determined to be a sidelobe target and is ignored. The main channel is thereby "blanked" by the blanking channel.

A blanker channel is conventionally used to eliminate returns from large targets that are located outside of the radar main beam. It is also used to reject pulsed interfering signals from the sidelobe region of the main enhanced antenna pattern. A radar system operates on the assumption that larger signals come from the direction of the dominant lobe which is the direction of immediate interest. However, where a large signal from a very large target or source is received from the direction of a sidelobe, it may be misinterpreted as a signal from the direction of the dominant lobe. To allow the system to ignore such sidelobe signals, blanking has been used. In that approach the same signals are received through an omnidirectional antenna channel, that is, one which does not have a lobed sensitivity pattern. The sensitivity of this "blanker" channel is slightly greater than the sensitivity of the smaller sidelobes of the main channel. The signals from the two antenna channels are compared before display. Where a signal is larger from the main antenna it is known to be from the main beam direction. However, where the main channel signal is less than that in the blanker channel, it is known to be from a sidelobe and is not displayed.

Adaptive nulling is an interference reduction technique which is primarily directed toward elimination of continuous wave interference sources by orienting the sidelobes of an antenna pattern so that the nulls of the pattern are directed toward the continuous wave source. Sidelobe blanking is a technique that eliminates the effects of pulsed interference that arrives from the sidelobe region of the main channel pattern. Because of the different type of interference each technique addresses, it would be desirable to combine the two techniques. However, prior efforts to use adaptive nulling and sidelobe blanking together have suggested that the two are incompatible.

Figure 4:
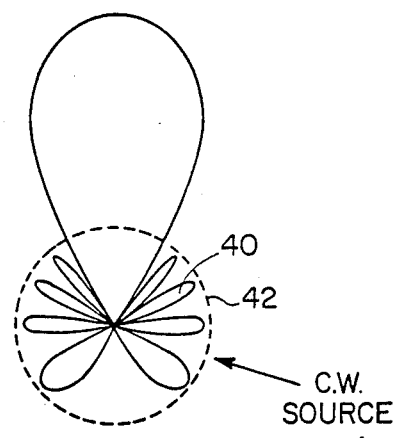
FIG. 4 shows the antenna response patterns of an adaptively nulled main channel and an omnidirectional blanker channel.

FIG. 4 shows an adaptively nulled main channel pattern 40 on which is superimposed an omnidirectional blanker pattern 42. The sensitivity of the blanker channel is set just higher than the sensitivity of the sidelobes of the main channel pattern. A decision is made on the validity of each signal return by comparing the signal power in each of the channels. If the power in the main beam channel is higher than the blanker channel power, the return is determined to be a valid main beam target. However, if the power in the blanker channel is higher than that in the main beam channel, the return is determined to be a sidelobe target and is disregarded.

The compatability problem arises with the presence of a continuous wave interference source 44 directed toward the receiver. Although a null of the adaptive array is oriented in the direction of the interference 44 to nullify its effect, the power of the interfering signal is nonetheless received by the omnidirectional blanker channel. Thus, the power received in the blanker channel is relatively high due to the presence of the interfering signal. Because the blanker channel power is used to reject signals in the main beam channel, the technique of adaptively steering the nulls of the main beam lobe pattern is effectively negated. The dynamic range of the main beam is reduced by the high power in the blanker channel and the adaptive nulling is rendered ineffective.

In a preferred embodiment of the invention, adaptive nulling and sidelobe blanking are effectively combined. By adaptively nulling in the blanking channel, the effect of interference power in the blanking channel is eliminated. The processor 16 generates a steering vector which has all weights equal to zero except one, and that one weight is equal to 1. As a quiescent antenna pattern, this steering vector corresponds to an omnidirectional antenna pattern as is typically used in blanking. The steering vector is then premultiplied by the inverse of covariance matrix which has already been generated. The resulting weights are applied to the original signals from the antenna array to create blanker signals. These weights create a blanker channel pattern which is essentially omnidirectional but which has pattern nulls directed toward noise sources specified by the covariance matrix. Therefore, in this system, main channel and blanker channel weights are obtained by multiplying the same covariance matrix inverse by two different steering vectors. Furthermore, the same received radar data are combined twice, using two different sets of weights, in order to form the main channel signal and the blanker signal.

In FIG. 3, the output branch 30 of the Baseband Quadrature converter 25 delivers the digitally coded antenna signal to multiplier node 32. At this node, the antenna signal is multiplied by the weight $W_{BN}$ generated by the processor 16. The weight $W_{BN}$ is the weight designated for the Nth antenna from the set of weights defined by the omnidirectional steering vector premultiplied by the inverse of the covariance matrix. When combined, the set of blanker weights form an antenna pattern which is nearly omnidirectional but which has pattern nulls in those directions specified by the interference information contained in the covariance matrix.

Figure 5:
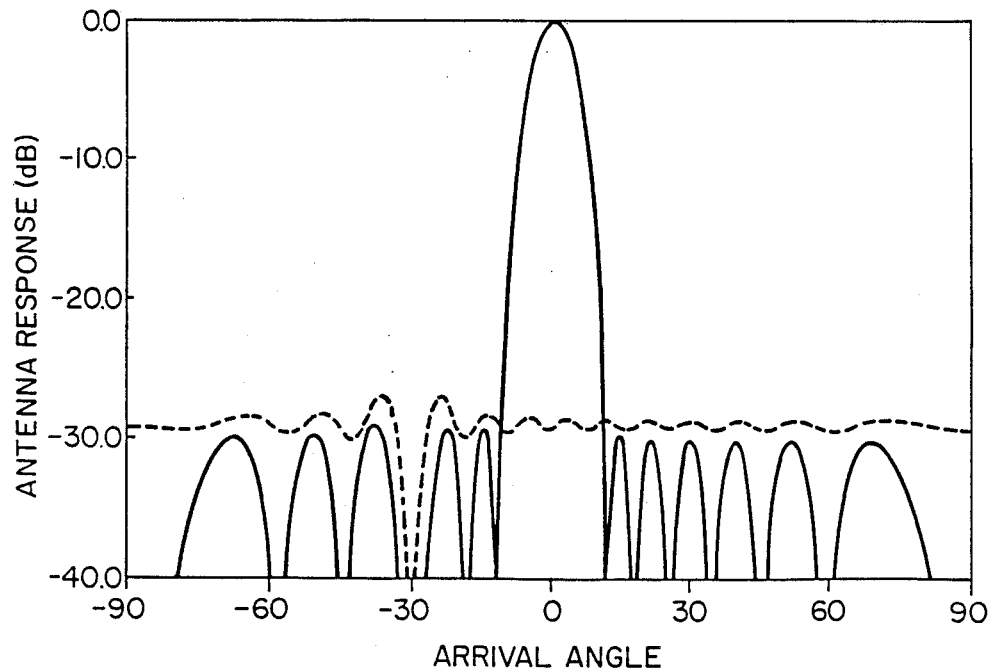
FIG. 5 shows the antenna response patterns of an adaptively nulled main channel and an adaptively nulled blanker channel.

FIG. 5 shows an example of the adapted main beam and blanker antenna patterns when there is a strong continuous wave interfering signal present. Both patterns have nulled the interference at $-30°$, and away from the null region the blanker pattern is just slightly above the main beam sidelobes everywhere but in the main beam. Thus, the continuous wave interference has been eliminated from both the main channel and the blanker channel, and the blanker pattern allows for proper blanking operation with a reasonable blanker level.

Thus, conventional adaptive nulling is performed by weighting sequences of samples from respective antennas. The same sequences are separately weighted by other weights to provide an adaptive blanking signal. The two weighted sequences are compared to select the signals from the main beam. From the selected signals, a radar display and other outputs are provided.

While this invention has been particularly shown and described with references to preferred embodiments thereof, it will be understood by those skilled in the art that various changes in form and details may be made therein without departing from the spirit and scope of the invention as defined by the appended claims.

For example, the digital signal may be processed in special purpose hardware, by software programmable general purpose hardware or by a combination as shown. The weighting, for example, could be handled by the processor 16. Also analog implementations or weight implementations at an intermediate frequency are also easily accomplished.

I claim:

1. A method of detecting radar signals comprising:
   providing an antenna array;

generating an interference representation of interference signals received through the antenna array;

transmitting a radar signal and receiving through each antenna of the antenna array a reflected signal;

generating an adaptively nulled representation of the reflected signal by weighting the received signals by a first weighting matrix which defines a main beam pattern with at least one dominant lobe, modified by the interference representation;

generating a blanking signal by weighting the received signals by a second weighting matrix which defines a generally omnidirectional antenna pattern modified by the interference representation; and providing a radar display of the adaptively nulled representation blanked by the blanking signal.

2. The method of claim 1 wherein generating an interference representation of an interference signal comprises assembling a background matrix of complex numerical elements, each element corresponding to the product of the ambient signals as received by one pair of antenna elements of the antenna array.

3. The method of claim 2 wherein the background matrix is the covariance matrix of the system.

4. The method of claim 2 wherein said antenna pattern pattern is represented by a first steering vector comprising the weights of the antenna array necessary to generate said antenna pattern.

5. The method of claim 4 wherein the first weighting matrix represents the product of the inverse of the background matrix with the first steering vector.

6. The method of claim 2 wherein said generally omnidirectional antenna pattern is represented by a second steering vector comprising the weights of the antenna array necessary to generate said generally omnidirectional antenna pattern.

7. The method of claim 6 wherein the second weighting matrix represents the product of the inverse of the background matrix with the second steering vector.

8. The method of claim 6 wherein the second steering vector is such that all but one of the antenna weights equal zero.

9. A method of detecting radar signals comprising:
providing an antenna array; generating a covariance matrix of complex elements representative of ambient interfering signals received through the antenna array;

transmitting a radar signal and receiving through each antenna of the antenna array a reflected signal;

generating an adaptively nulled representation of the reflected signal by weighting the received signals by a set of complex weights, the set of complex weights being formed by multiplying the inverse of the covariance matrix, by a first steering vector which defines a desired quiescent antenna weighting pattern;

generating an adaptively nulled blanking signal by weighting the received signals by a set of complex weights, the set of complex weights being formed by multiplying the inverse of the covariance matrix, by a second steering vector which defines a generally omnidirectional antenna weighting pattern;

comparing the adaptively nulled representation of the reflected signal with the adaptively nulled blanking signal to determine the validity of information contained in the adaptively nulled representation of the reflected signal; and displaying valid information contained in the adaptively nulled representation of the reflected signal on a radar display.

10. A radar system comprising:
an array of antennas through which the ambient signals are received;

a processor which generates an interference representation of the ambient signals, the processor also generating a blanked, adaptively nulled representation of a received signal by weighting the received signal by a first weighting vector which defines an antenna pattern with at least one dominant lobe, blanked by a second weighting vector which defines a generally omnidirectional pattern, the patterns being modified by the interference representation; and a display for displaying the blanked, adaptively nulled representation of the received signal.

11. The radar system of claim 10 further comprising system memory in which digitized signals are stored.

12. The radar system of claim 10 wherein the weights of each vector are represented by complex numbers.

* * * * *